United States Patent
Peyrovian et al.

(12)

(10) Patent No.: US 6,707,800 B1
(45) Date of Patent: Mar. 16, 2004

(54) ATM NETWORK WITH CENTRAL CALL PROCESSOR

(75) Inventors: M. Javad Peyrovian, Irvine, CA (US); Lawrence C. Pond, Manhattan Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/164,622

(22) Filed: Oct. 1, 1998

(51) Int. Cl.⁷ ............................................. H04B 7/00
(52) U.S. Cl. ............................. 370/310.1; 370/395.1; 370/398
(58) Field of Search ................................ 370/389, 390, 370/392, 395, 396, 397, 398, 399, 400, 401, 395.2, 395.3, 395.31, 315, 316, 310.1, 310.2

(56) References Cited

U.S. PATENT DOCUMENTS

| | | | | |
|---|---|---|---|---|
| 5,959,972 A | * | 9/1999 | Hamami | 370/228 |
| 6,026,092 A | * | 2/2000 | Abu Amara et al. | 370/411 |
| 6,055,239 A | * | 4/2000 | Kato | 370/409 |
| 6,137,798 A | * | 10/2000 | Nishihara et al. | 370/392 |
| 6,185,213 B1 | * | 2/2001 | Katsube et al. | 370/397 |
| 6,226,263 B1 | * | 5/2001 | Iwase et al. | 370/231 |
| 6,249,522 B1 | * | 6/2001 | Komine | 370/399 |

* cited by examiner

Primary Examiner—Douglas Olms
Assistant Examiner—Bob A. Phunkulh
(74) Attorney, Agent, or Firm—V. D. Duraiswamy; M. W. Sales

(57) ABSTRACT

An ATM network comprises a central call processor, and one or more remotely located ATM bridge nodes, whereby the call processor is separated from the switching fabric in the ATM bridge nodes. A plurality of preestablished permanent virtual paths are defined within the ATM bridge nodes. In setting up a connection, a source user terminal communicates with the central call processor to obtain the virtual path identifier associated with the virtual path to one or more destination user terminals. The user data is segmented into one or more cells that incorporate a header containing the appropriate VPI. The ATM bridge node extracts the VPI from incoming cells, and then directs these cells to the appropriate output ports in accordance with a routing table. The instant invention provides for improved network efficiency and upgradability, and is particularly suited to satellite based ATM networks.

33 Claims, 4 Drawing Sheets

ATM NETWORK WITH CENTRAL CALL PROCESSOR

TECHNICAL FIELD

The instant invention generally relates to asynchronous transfer mode (ATM) networks and more particularly to ATM networks incorporating remotely located ATM nodes.

BACKGROUND OF THE INVENTION

An ATM network is a connection-oriented communications network incorporating packet-switching, wherein messages are segmented and incorporated into associated cells, with each cell containing the addressing information sufficient to travel a path along the network interconnecting the sender and one or more recipients of the message. Packet switched networks are well suited to handling interactive traffic, and generally exhibit reduced delays and improved throughput in comparison networks incorporating circuit-switching. In contrast with circuit-switching which statically reserves the required bandwidth in advance, packet switching acquires and releases bandwidth as needed, so that bandwidth unused by one user may be used by another rather than being wasted.

ATM has been identified as a key technology for supporting voice, data, and multimedia services. For example, an ATM network is the underlying technology for a new wide area service called B-ISDN (Broadband Integrated Services Digital Network) which offers video on demand, live television from a variety of sources, full motion multimedia electronic mail, CD-quality music, LAN interconnection, high speed data transport, and other services.

Since the ATM network is connection-oriented, making a call requires first sending a message to set up the connection, after which subsequent cells follow the same path to the destination. After the call is complete, the connection is torn down. Furthermore, being connection-oriented, the order of cell delivery is guaranteed, but the delivery of ATM cells is not guaranteed. This order is particularly important for audio and video broadcast messages.

The main building blocks of an ATM network are ATM switches, which comprise the following three basic parts: the transport interfaces, the switch fabric, and the call processor. The transport interface recovers the information bits from the transmission waveforms. The switch fabric switches the ATM cells based upon the Virtual Path Identifier (VPI) and Virtual Circuit Identifier (VCI) indicators in the header of the ATM cell. The call processor routes, sets up, and tears down calls.

In prior art ATM networks, each ATM switch incorporates an associated call processor for establishing the connection. When the connection request arrives, the call processor examines the validity of the request, the availability of the required bandwidth, and the possibilities for routing within the network. The call processor then determines how the given ATM switches should be configured to establish a virtual path within the network necessary to make the connection. The call processor may need to communicate with a database in order to make this determination. New VPI and VCI indicators are configured for each connection, and the routing tables in the ATM switches are configured to establish the associated virtual paths and virtual circuits within the ATM network. Thereafter, ATM cells from a given source user terminal are coded with the appropriate VPI and VCI indicators in the associated headers so that the cells are routed along the proper virtual paths and virtual circuits within the ATM network. This cell-switching arrangement provides a number of associated advantages, including the flexibility to readily handle both constant (audio, video) and variable rate traffic (data), the facilitation of traditional multiplexing techniques using digital switching, and the accommodation of broadcasting from one sender to a plurality of receivers. Alternately, permanent virtual circuits may be established within the ATM network, by which the associated circuit connections remain in place for an extended period of time responsive to a prior agreement between the customer and the carrier, analogous to a leased telephone line.

When an ATM switch is located in a satellite, the associated switch hardware is essentially not upgradable, while the associated software may generally be upgraded to a limited extent. When routing a call, a satellite ATM switch exchanges signaling messages with the user terminal, other ATM switches, and databases. At any given time there could be, for example, a few hundred thousand connections or calls through the satellite, each call having associated states and signaling message exchanges, which require the associated satellite to have a complex call processor.

With the introduction of new telecommunication services and features, the call processor software and sometimes the hardware needs to be upgraded. One problem with prior art ATM switches that are remotely located, such as in a satellite, is that this may not be feasible. Satellite hardware is generally not upgradable, and satellite software may have only limited upgrade capabilities. While the software and sometimes the hardware of the call processor are routinely upgraded to support new telecommunication services and features, other elements of the ATM switch are generally relatively stable. Another problem with prior art ATM switches that are located in satellites and other remote locations and which incorporate a call processor, is the associated limitation on the weight and power consumption of the call processor, and the demands that the call processor has on associated support resources at the remote location. Yet another problem with prior art ATM switches is that when establishing a new connection, the process of generating new VPI and VCI indicators requires associated control messages that are a burden to the system, even for prior art systems where the call processor is physically separated from the associated switch fabric.

SUMMARY OF THE INVENTION

Accordingly, while it is generally desirable to both incorporate relatively simple electronics in the satellite and minimize the weight of any associated components, it is also desirable to efficiently utilize satellite bandwidth, and to provide new services and features as they emerge.

The instant invention overcomes the above-noted problems by providing an improved ATM network that incorporates a central call processor residing in a ground station in combination with remotely located ATM bridge nodes that incorporate the associated switch fabric. By physically separating the call processor from the switch fabric, and by physically locating the call processor at a conveniently located ground station, the associated remotely located electronics of the switch fabric can be simplified resulting in lower weight and power consumption, and in increase reliability and throughput. Moreover, by placing the call processor at a convenient location, the hardware or the software of the call processor may be readily upgraded as necessary to provide new services and features.

The remotely located ATM bridge nodes incorporate permanent ATM virtual paths that provide connections having flexible bandwidth resulting in a more efficient utilization of transmission resources of the remotely located ATM bridge node. When there is no user traffic on a particular permanent virtual path, only operations administration and maintenance (OAM) cells flow through the permanent virtual path as necessary, so that only a negligible amount of channel capacity is used for maintaining the permanent virtual path. The channel capacity that had been assigned to that particular permanent virtual path in a given transmission channel is then available to be used by other virtual paths in that channel for corresponding active virtual circuits therein. This results in providing bandwidth-on-demand resulting in a more efficient utilization of the satellite transmission capacity.

Signaling between the call processor and the remotely located ATM bridge nodes is not required for setting up, maintaining, or tearing down a new connection, unlike prior art ATM networks. Instead, signal message exchange takes place between the call processor, user terminals, other ATM switches, and data bases as required.

The permanent ATM virtual paths preclude the need for connection setup messages that would otherwise be required for configuring the ATM bridge switching fabric, thereby reducing the number of control messages to the bridge node and further increasing the bandwidth efficiency thereof. Furthermore, since the remotely located ATM bridge node incorporates permanent ATM virtual paths and therefore does not have to process control messages otherwise required to configure the switch for each connection, the processing throughput of the associated switch fabric is reduced, thereby increasing the efficiency of resource utilization in the remotely located ATM bridge node.

The remotely located ATM bridge nodes that relay ATM cells based upon an associated Virtual Path Identifier (VPI) are used to establish virtual path segments comprising one or more ATM bridge nodes within the network. The central call processor uses the virtual path segments to establish voice, data, or multimedia connections, but does not need to configure the ATM bridge to establish a new switched virtual connection since the associated ATM bridge node(s) incorporate permanent virtual paths that are generally reconfigured through the management interface, not through the signaling interface.

The above recited benefits are particularly pertinent to satellite based ATM bridge nodes, for which power and weight limitations are severe, for which reliability is important, for which physical access to make hardware changes is virtually impossible, and for which the extent of software upgrades is generally limited.

Accordingly, one object of the instant invention is to provide an improved ATM network that can be upgraded without having to access remotely located ATM bridge nodes. Another object of the instant invention is to provide an improved ATM network with improved throughput and reliability.

A further object of the instant invention is to provide an improved ATM network for which remotely located ATM bridge nodes can operate more efficiently and consume less power. A yet further object of the instant invention is to provide an improved ATM network with reduced overhead for establishing connections and with reduced processor throughput requirements at remotely located ATM bridge nodes.

In accordance with these objectives, the instant invention incorporates of one or more simplified ATM bridge nodes for which preestablished permanent virtual paths are defined that associate each signal input with one or more signal outputs in accordance with a Virtual Path Identifier (VPI) stored in an associated routing table. An accessibly located central call processor provides the particular VPI to the sending user terminal during the signaling process for establishing a connection with one or more receiving user terminals. Unused bandwidth from idle virtual paths or virtual circuits within a given transmission channel is made available to virtual paths and virtual circuits passing ATM cells within the transmission channel.

One advantage of the instant invention with respect to the prior art is that by incorporating a central call processor at a convenient location, the associated hardware and software can be readily repaired or upgraded, thereby increasing the adaptability and reliability of the communications system.

Another advantage of the instant invention is that by incorporating a central call processor at a convenient location, the weight and power requirements of the satellite ATM bridges are reduced, thereby providing improved throughput and reliability.

Yet another advantage of the instant invention is that by incorporating permanent virtual paths within the satellite ATM bridges whereby unused bandwidth from idle virtual paths or virtual circuits within a given transmission channel is made available to virtual paths and virtual circuits passing ATM cells within the transmission channel, the ATM bridges of the instant invention more efficiently utilize the transmission bandwidth capacity of the satellite.

These and other objects, features, and advantages of the instant invention will be more fully understood after reading the following detailed description of the preferred embodiment with reference to the accompanying drawings and viewed in accordance with the appended claims. While this description will illustrate the application of the instant invention in satellite communications network, it will be understood by one with ordinary skill in the art that the instant invention can also be applied to any ATM network, and particularly to ATM networks for which one or more ATM bridge nodes are placed at remote locations that are difficult to access.

BRIEF DESCRIPTION OF THE DRAWINGS

FIG. 4b illustrates the ATM layer header at the User-Network Interface (UNI);

FIG. 4c illustrates the ATM layer header at the Network-Network Interface (NNI);

BEST MODE(S) FOR CARRYING OUT THE INVENTION

Figure 1:
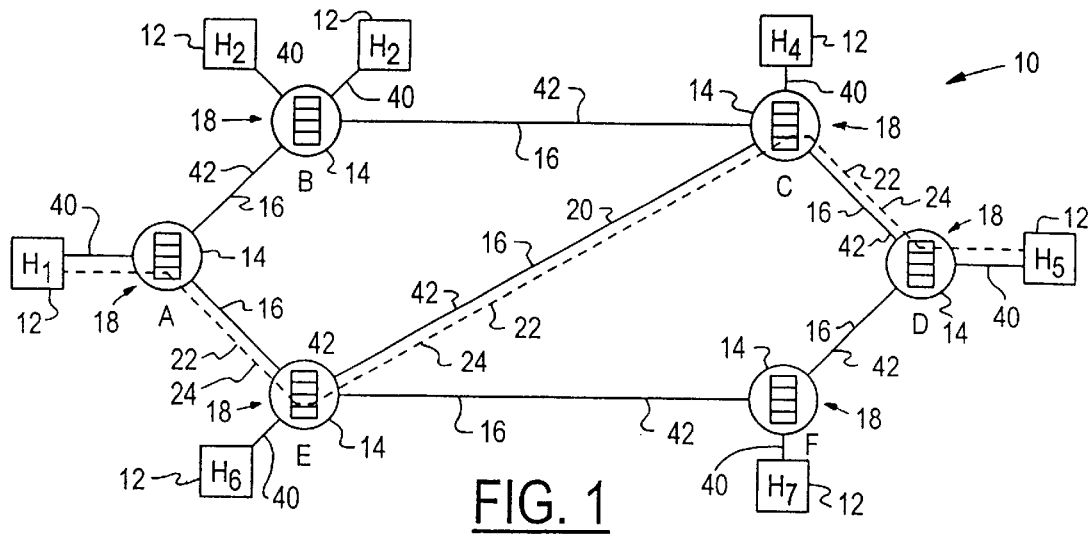
FIG. 1 illustrates a virtual circuit in a communications network.

Referring to FIG. 1, an ATM network 10 comprises the interconnection of a plurality of user terminals 12, or hosts, each of which is connected to an associated ATM switch 14 constituting a node of the ATM network 10. Each ATM switch 14 is interconnected with one or more other ATM switches 14 via transmission paths 16, each comprising one or more transmission channels 20. The ATM switches 14 contain associated routing tables 18 which associate the addresses of a virtual circuits 22 and virtual paths 24 with a particular set of transmission paths 16 interconnecting a source user terminal 12 (for example, H1) with one or more destination user terminals 12 (for example, H5). Depending upon the type of communications and equipment, each user terminal 12 can be either exclusively a source, exclusively a destination, or both a source and a destination.

Figure 2:
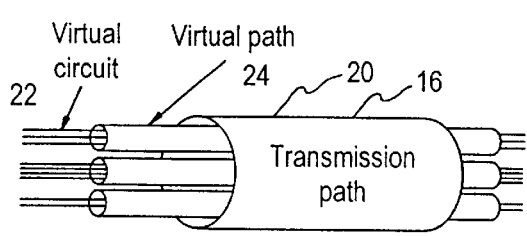
FIG. 2 illustrates the relationship between a virtual circuit, a virtual path and a transmission path.

Referring to FIG. 2, a transmission path 16 comprises the physical link by which information is transmitted, for example one or more sets of wire or fiber cables upon which propagate guided electromagnetic waves; or a free space beam of electromagnetic waves. A given transmission path 16 may contain a plurality of transmission channels 20, each corresponding to an associated spectral band. Each transmission channel 20 further comprises one or more virtual paths 24 in accordance with an associated multiple access protocol, each virtual path 24 comprising one or more unidirectional virtual circuits 22 each corresponding to the connection of a source with one or more destinations.

Figure 3:
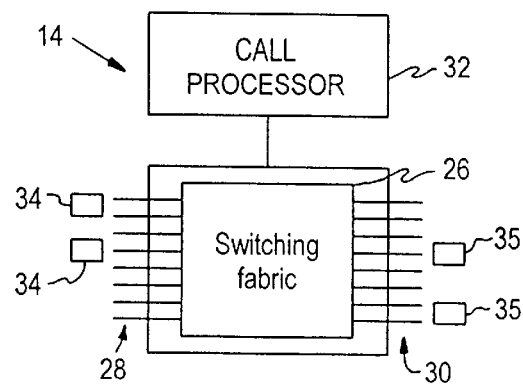
FIG. 3 illustrates a general ATM switch.

Referring to FIG. 3, prior art ATM switches 14 comprise a cell switching fabric 26 by which each input cell 34 at ports 28 is switched to one or more output cells 35 at ports 30 under the direction of a call processor 32. For example, the switching fabric 26 could comprise a knockout switch, by which all possible switch connections can be made without collisions, or a Batcher-Banyan switch, comprising a plurality of stages reducing cost and complexity at the expense of potential collisions. ATM cells 34 traveling along given virtual circuits 22 that are part of given virtual paths 24 that arrive at an input port 28 of the switching fabric 26 are directed thereby to the appropriate output ports 30 within the respective virtual circuits and virtual paths.

Figure 4:
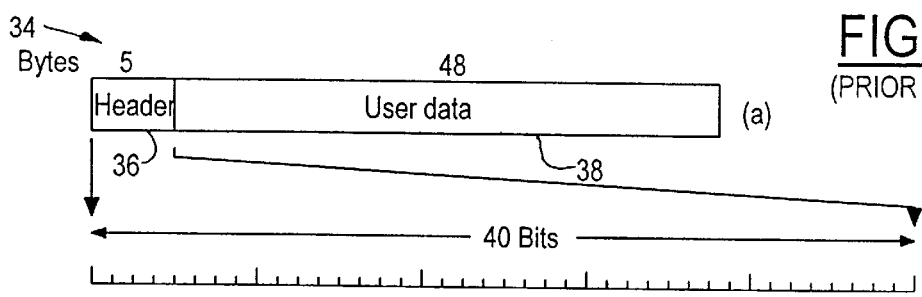
FIG. 4 illustrates a standard ATM cell.
Figure 4:
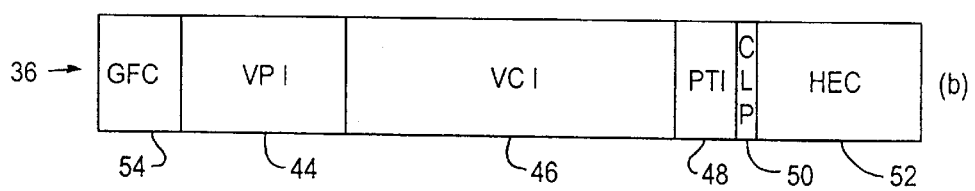
Figure 4:
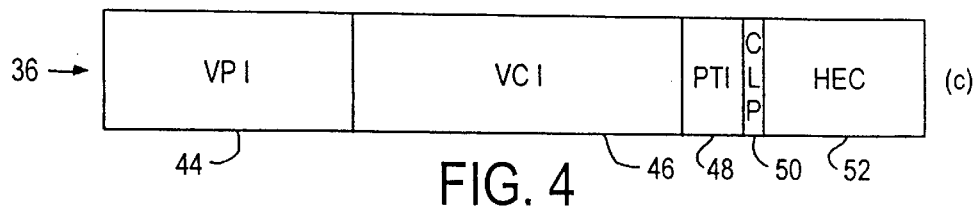

In accordance with the ATM, all information is transmitted in small fixed-size packets called cells. Referring to FIG. 4(a), a standard ATM cell 34 is 53 bytes long, comprising a 5 byte header 36, and 48 bytes of user data 38. FIG. 4(b) illustrates the structure of the header 36 for cells utilized in the User Network Interface (UNI) 40, by which the user terminals 12 communicate with the ATM network 10. FIG. 4(c) illustrates the structure of the header 36 for cells utilized in the Network Network Interface (NNI) 42, by which ATM switches 14 communicate with other ATM switches 14 within the ATM network 10 (FIG. 1). In each case, the header 36 contains a Virtual Path Identifier (VPI) 44, a Virtual Circuit Identifier (VCI) 46, a Payload Type Indicator (PTI) 48, a Cell Loss Priority (CLP) indicator 50, and a Header Error Check (HEC) indicator 52 in accordance with ATM standards. Furthermore, the header 36 for cells utilized in the UNI 40 incorporate a General Flow Control (GFC) indicator 54.

Figure 5:
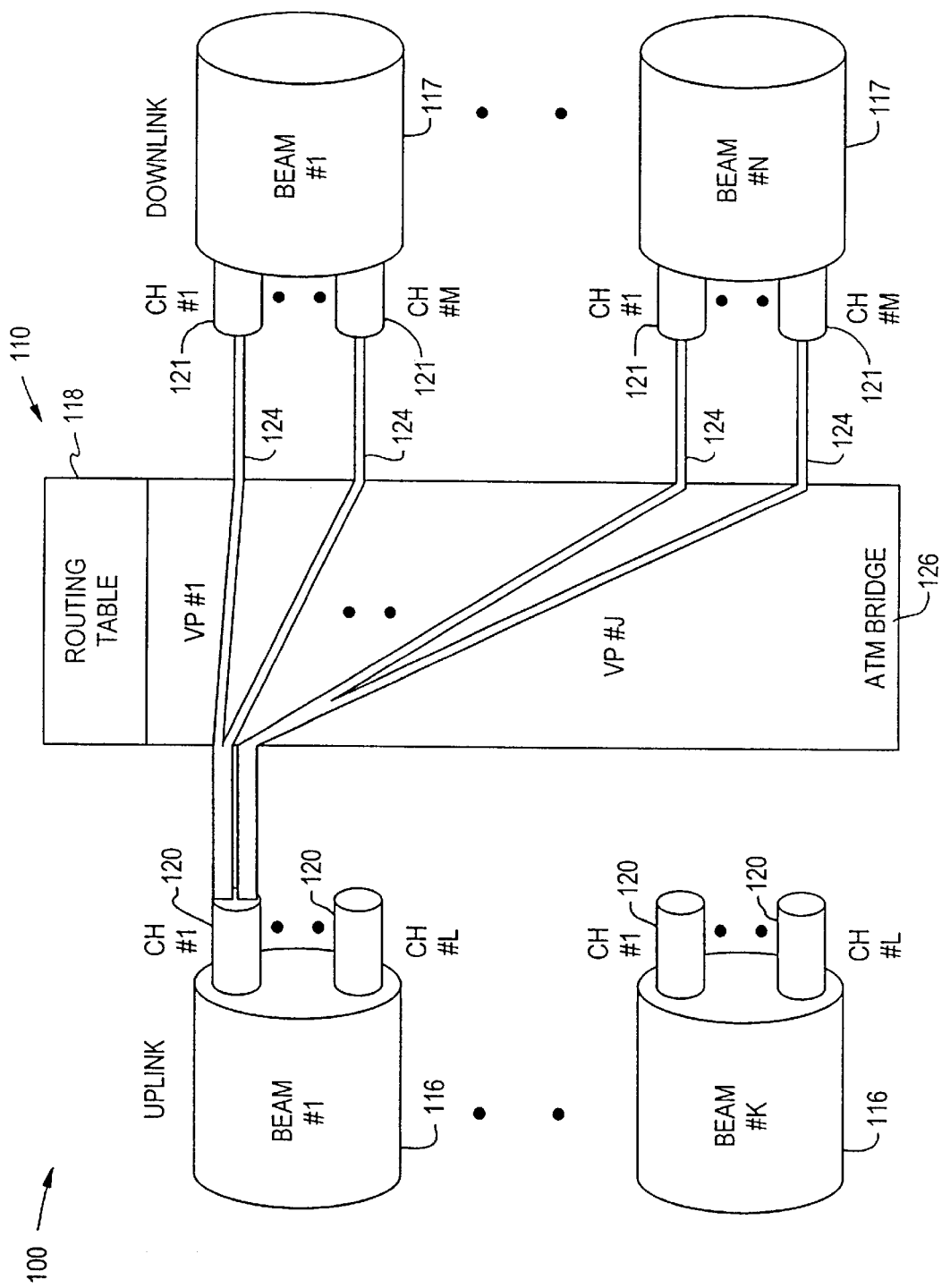
FIG. 5 illustrates an ATM bridge in accordance with the present invention.

Referring to FIG. 5, a satellite ATM bridge 100 receives a plurality of K uplink beams 116 of electromagnetic energy, each uplink beam 116 comprising a plurality of associated uplink transmission channels 120, each uplink transmission channel 120 comprising an associated spectral band. The satellite ATM bridge 100 also transmits a plurality of N downlink beams 117, each downlink beam 117 comprising a plurality of associated downlink transmission channels 121, each downlink transmission channel 121 comprising an associated spectral band. Each uplink or downlink channel contains a plurality of virtual paths. The ATM Bridge 100 comprises a switching fabric 126 and an associated routing table 118 and connects each input virtual path carrying ATM cells with one or more virtual output ports in accordance with preestablished permanent virtual paths (PVP) 124 through the ATM bridge 110. The permanency of these permanent virtual paths (PVP) 124 is relative to a given call or connection, wherein the existence of the virtual path is not affected by the setup or tear down of the call or connection. The permanent virtual paths (PVP) 124 remain fixed within the satellite for relatively a long time and they are configured through the operations interface.

In operation, the associated transport interface of the ATM bridge 110 extracts incoming ATM cells from the input ports associated with respective uplink transmission channels 120 of the uplink beams 116, decodes the associated cell header, and extracts the associate VPI indicator therefrom. The VPI indicator is then used by a table lookup operation to determine from the routing table 118 to which output ports the ATM cell is to be routed. Accordingly, the ATM cell from a given input port is routed to the appropriate output ports on specified downlink transmission channels 121 of specified downlink beams 117 so that the given ATM cell travels along the preestablished permanent virtual paths 124 as if the permanent virtual paths 124 were hardwired connections.

The number of uplink beams 116, uplink transmission channels 120, downlink beams 117, or downlink transmission channels 121 does not need to match. Each uplink transmission channel 120 carrying ATM cells is connected to some or all downlink transmission channels 121 via a permanent virtual path 124 through the ATM bridge 110. If at a given point in time a particular permanent virtual path 124 does not carry any ATM cells, the permanent virtual path 124 is maintained in an idle condition and carries only the Operations And Maintenance (OAM) cells as necessary. A given permanent virtual path 124 may be established through one or more ATM nodes—satellite nodes, terrestrial nodes, or a combination of the two. The permanent virtual paths 124 are generally established through the operations systems interface, and in accordance with the instant invention are not changed by requests for new calls or connections; or by completion of existing calls or connections. However, the throughput of a particular permanent virtual path 124 is flexible and can change with the calls or connections. More particularly, each transmission channel 120, 121 generally supports a plurality of associated permanent virtual paths 124 upon which are generally multiplexed a plurality of associated virtual circuits. Bandwidth assigned to idle virtual circuits within a given transmission channel 120, 121 is made available to other virtual circuits within the same transmission channel 120, 121 so as to most efficiently utilize the bandwidth capacity of the given transmission channel 120, 121.

Figure 6:
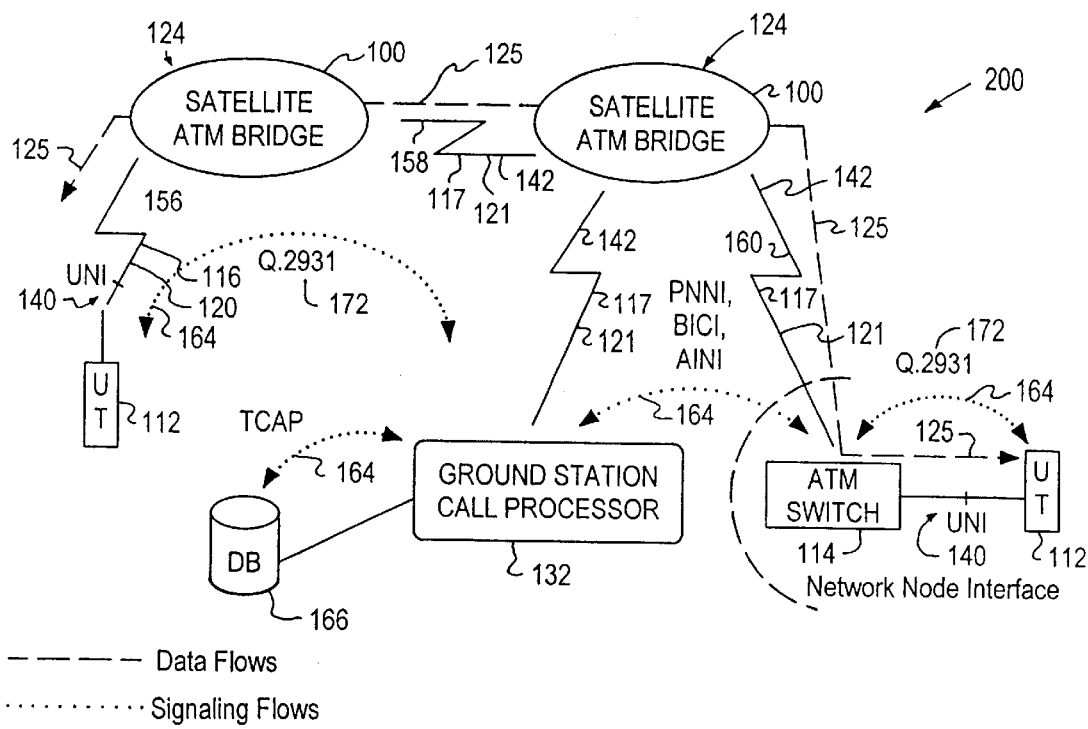
FIG. 6 illustrates an ATM network in accordance with the present invention.

Referring to FIG. 6, an ATM network 200 incorporating the instant invention comprises a central call processor 132 for establishing a connection between a source and destination user terminals 112 via a virtual path 125 comprising an uplink 156 from the source user terminal 112 to a satellite ATM bridge 100 in accordance with a User Network Interface (UNI) 140, an inter-satellite link 158 to a second satellite ATM bridge 100 in accordance with a Network-Network Interface (NNI) 142, and a downlink 160, in accordance with a NNI 142, to a terrestrial network in communication with the destination user terminal 112 in accordance with a UNI 140, wherein the virtual path 125 within the satellite bridges 100 constitutes a permanent virtual path 124. A virtual path 125 is divided into an associated plurality of virtual path segments interconnected by ATM nodes. A simpler example of the instant invention would incorporate a virtual path 125 without the inter-satellite link 158.

The satellite ATM bridges 100 pass data traffic along the permanent virtual paths 124 therein, in accordance with the VPI of the associated ATM cells. The satellite ATM bridges 100 may also pass cells along the permanent virtual paths 124 therein, in accordance with the Payload Type Identification (PTI) field of the associated ATM cells, whereby the PTI field can indicate for example if the cell contains user data or maintenance information, if congestion has been experienced, the type of cell, or whether the cell is for resource management. For example, during connection setup in accordance with the Q.2931 protocol 172, associated Q.2931 cells having a particular PTI would be passed to the central call processor 132.

Signaling messages 164 are exchanged between the user terminals 112, other ATM switches 114 and the central call processor 132; and are processed after reaching the central call processor 132. Signaling between the user terminal 112 and the ATM network 200 is in accordance with the Q.2931 protocol, while signaling between ATM switches 114 and the central call processor 132 is in accordance with Private Network Node Interface (PNNI), Broadband Inter-Carrier Interface (BICI), or ATM Inter-Network Interface (AINI) protocols. The central call processor 132 is either external to all ATM nodes or incorporated in one terrestrial ATM node. Responsive to a request from a user terminal 112 to establish connection, the central call processor 132 determines the route for the call and determines the VPI values to be used by the terrestrial terminals for cells that are sent to the satellite ATM bridges 100. The satellite ATM bridges 100 then routes the ATM cells to the appropriate beams and channels using the VPI assigned to the ATM cell, in accordance with the preestablished permanent virtual paths 124 within the satellite ATM bridges 100. VPI translation if performed within the ATM network 200 as necessary, for example prior to transferring an ATM cell from a first satellite ATM bridge 100 to a second satellite ATM bridge 100, wherein each satellite ATM bridge 100 uses a different VPI value for respective permanent virtual paths 124 corresponding the same overall virtual path 125 from source to destination. The central call processor 132 has access to a database 166 that provides the network topology and a table of virtual paths through the satellite ATM bridges 100 or the ATM network 200, whereby communication with the database is in accordance with the Transactions Capability Application Part (TCAP) protocol. The central call processor 132 uses this information when determining the route of the virtual path and the associated VPI and VCI values.

After the signaling process is completed by which the appropriate VPI and VCI values are determined as necessary to route an ATM cell from a given source to a given destination, the user terminal 112 thereafter incorporates the appropriate VPI and VCI values in the header of the ATM cells, whereby the routing tables 118 in the satellite ATM bridges automatically route these ATM cells along appropriate permanent virtual paths 124 within the satellite ATM bridges 100 so that the ATM cells ultimately reach their proper destination.

Figure 7:
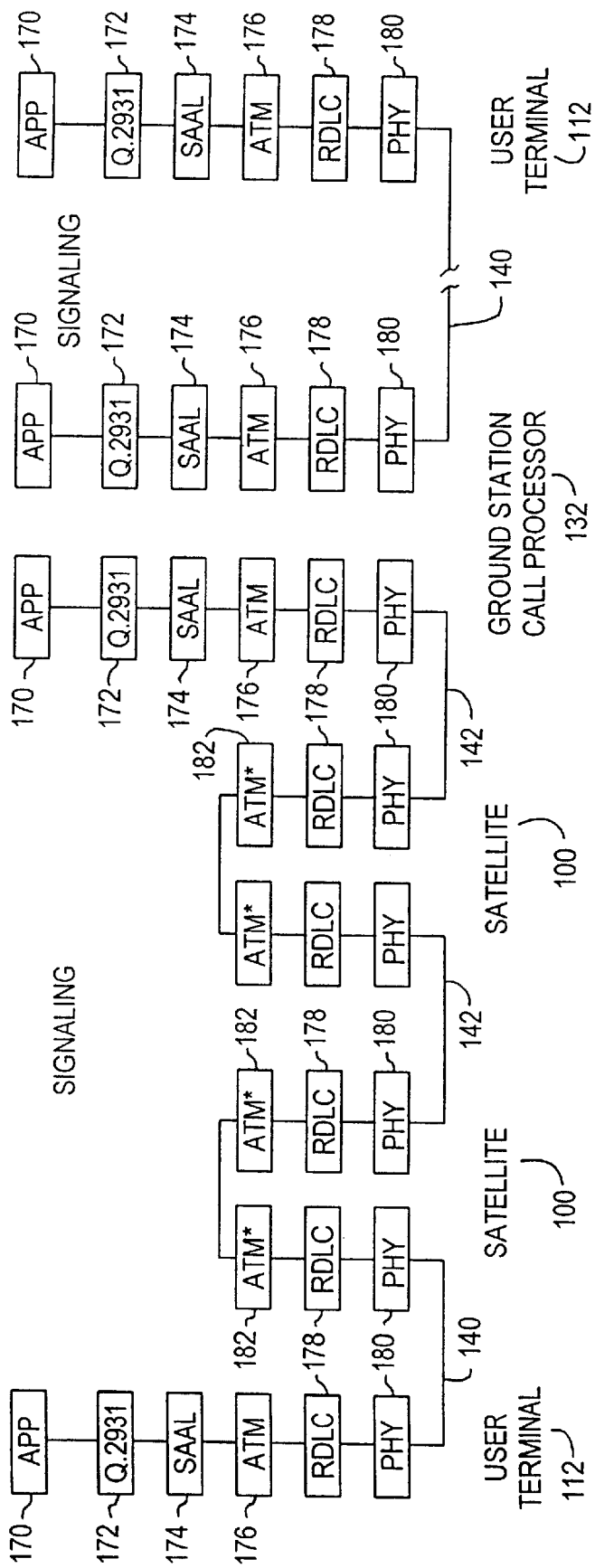
FIG. 7 illustrates the protocol architecture for signaling in accordance with the present invention.

The signaling process is conducted in accordance with the protocol architecture illustrated in FIG. 7 for the ATM network 200 illustrated in FIG. 6. The user terminal 112 initiates a request for a connection setup in accordance with the applications protocol (APP) 170. The Q.2931 protocol 172 in the control plane or layer handles the connection setup, which is passed on to the Signaling ATM Adaptation Layer (SAAL) 174 that performs ATM cell segmentation and reassembly, and provides a standard interface to the Q.2931 protocol 172 in the control layer. The segmented message is then passed from the SAAL 174 to the ATM layer 176 which provides flow control, generates and extracts cell headers, manages virtual circuits and virtual paths, and multiplexes and demultiplexes the ATM cells. The ATM cells are then further processed by the data link layer in accordance with the Radio Data Link Control (RDLC) protocol 178, which provides error control. The ATM cells are sent via the physical transmission layer (PHY) 180 from the user terminal 112 via the User-Network Interface 140 to a first satellite ATM bridge 100, where they are decoded in accordance with the RDLC protocol 178 and transferred from the input port to the appropriate output ports along an appropriate permanent virtual path within the ATM bridge 100, in accordance with the modified ATM layer (ATM*)

182 of the instant invention. The ATM cells directed by the satellite ATM bridge 100 to appropriate signal outputs are then processed in accordance with RDLC protocol 178 and transferred by the physical transmission layer 180 to a second satellite ATM bridge 100 in accordance with a Network-Network Interface 142, where they are processed as in the first satellite ATM bridge 100 before being directed to the central call processor 132 where the ATM cells are decoded in accordance with corresponding protocols and layers as had been used for encoding the ATM cells by the user terminal 112. The central call processor 132 returns the appropriate values for the VPI and VCI fields to the user terminal 112 in accordance with the same communication process as recited above, but in reverse order. As also illustrated in FIG. 7, a user terminal 112 may communicate with the central call processor 132 either directly, or via one or more satellite ATM bridges 100.

After the connection is established by the signaling process, user data is transferred between user terminals 112 without further interaction of the central call processor 132. The satellite ATM bridges 100 do not process the signaling messages, which reduces the complexity of the associated satellite ATM node.

Figure 8:
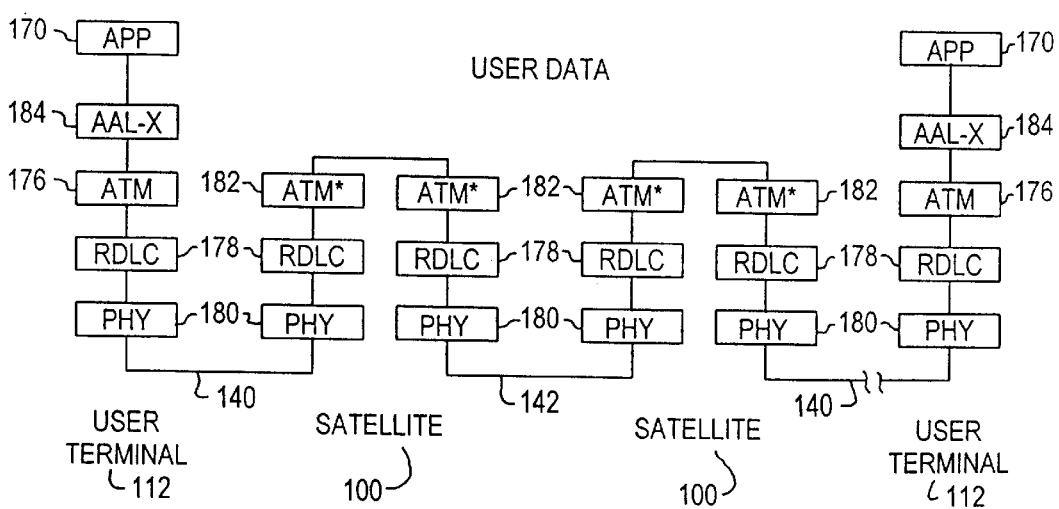
FIG. 8 illustrates the protocol architecture for data transfer in accordance with the present invention.

Referring to FIG. 8, after the connection is established, user data is transferred between user terminals 112 via the satellite ATM bridges 100 and virtual path 125. The data from the application layer (APP) 170 of user terminal 112 is passed on to the ATM Adaptation Layer (AAL-X) 184 via the appropriate layers (not shown) that comprise a convergence sublayer and a segmentation and reassemlby (SAR) sublayer. The AAL-X layer 118 comprises one of a variety of different protocols, for exampler AAL 1, AAL 2, AAL 3/4, and AAL 5, each tailored for a particular type of communications service. The AAL-X layer 184 performs ATM cell segmentation and reassembly. The segmented message is then passed for the AAL-X 184 to the ATM layer 176 which provides flow control, generates and extracts cell headers, manages virtual circuits and virtual paths, and multiplexes and demultiplexes the ATM cells. The ATM cells are then further processed by the data link layer in accordance with the Radio Data Link Control (RDLC) protocol 178, which provides error control. The ATM cells are sent via the physical transmission layer (PHY) 180 from the user terminal 112 via the User-Network Interface 140 to a first satellite ATM bridge 100, where they are decoded in accordance with the RDLC protocol 178 and transferred from the input port to the appropriate output ports along an appropriate permanent virtual path 124 within the ATM bridge 100, in accordance with the modified ATM layer (ATM*) 182 of the instant invention. The ATM cells directed by the satellite ATM bridge 100 to appropriate signal outputs are then processed in accordance with RDLC protocol 178 and transferred by the physical transmission layer 180 to a second satellite ATM bridge 100 in accordance with a Network-Network Interface 142, where they are processed as in the first satellite ATM bridge 100 before being directed to the destination user terminal 112 where the ATM cells are decodes in accordance with associated protocols and layers as had been used for encoding the ATM cells by the source user terminal 112.

An ATM network 200 in accordance with the instant invention comprises a collecting of interconnected ATM nodes, wherein the ATM nodes comprise either an ATM switch 114 or and ATM bridge 110. The difference between the ATM switch 114 an ATM bridge 110 is that the ATM switch 114 incorporates dynamic allocation of virtual paths 125 during connection setup while the ATM bridge 110 incorporates permanent virtual paths 124. The permanent virtual paths 124 and associated virtual path segments through the ATM bridges 100 in accordance with the instant invention are reconfigured through the management interface, not the signaling interface.

In accordance with the instant invention, the number of different VPI and VCI values necessary to uniquely designate all of the preestablished permanent virtual paths 124 and associated virtual circuits in an ATM bridge 110 can be greater than the capacity of the associated VPI 44 and VCI 46 fields in the header 36 of a standard ATM cell 34, such as illustrated in FIGS. 4(b) and 4(c). Accordingly, the instant invention is adapted to work ATM cells having VPI and VCI fields which are sized differently than in standard ATM cells 34, so as to accommodate any number of permanent virtual paths 124 and any number of associated virtual circuits.

One of ordinary skill in the art will appreciate that the signaling and data flow processes can occur over different paths, one of which may not necessarily incorporate ATM bridges 110 in accordance with the instant invention. Further, the ATM bridges 110 in accordance with the instant invention may be incorporated in either satellite or terrestrial nodes.

While specific embodiments have been described in detail in the foregoing detailed description and illustrated in the accompanying drawings, those with ordinary skill in the art will appreciate that various modifications and alternatives to those details could be developed in light of the overall teaching of the disclosure. Accordingly, the particular arrangements disclosed are meant to be illustrative only and not limiting as to the scope of the invention, which is to be given the full breadth of the appended claims and any and all equivalents thereof.

What is claimed is:

1. An ATM communications network comprising:
 a) a source generating an ATM cell;
 b) an ATM bridge node in communication with said source comprising:
  i) at least one input port;
  ii) at least one output port;
  iii) at least one permanent virtual path identified by an associated virtual path identifier, wherein responsive to said virtual path identifier incorporated in said ATM cell received at said at least one output port, said ATM cell is routed to said at least one input port associated with said permanent virtual path; and
  iv) a control layer; and
 c) a central call processor remotely located from said ATM bridge node and in communication with said source, wherein responsive to a request from said source said central call processor assigns a value for said virtual path identifier for said at least one permanent virtual path and said virtual path identifier transmitted by said call processor through said control layer of the ATM bridge node to the source, wherein said permanent virtual path is retained within said ATM bridge node after said ATM cell is transported.

2. An ATM communication network for transporting ATM cells from a source to one or more destinations as recited in claim 1, wherein said virtual path identifier value is assigned to a Virtual Path Identifier (VPI) field, said central call processor further assigns a value for a Virtual Circuit Identifier (VCI) field responsive to a request from said source, said header portion of each of said ATM cells also contains said VCI field, said VPI field identifies a virtual path by which said cell is delivered from said source to one or more destinations, said ATM cells are routed within said ATM bridge node in accordance with said VPI field, said VPI field specifies the path between said source and said one or more destinations, and said VCI field identifies a particular virtual circuit within the associated virtual path by which said cell is transported.

3. An ATM communications network for transporting ATM cells from a source to one or more destinations as recited in claim 1, wherein said ATM cell has a header which contains a Payload Type Identification (PTI) field and the said ATM bridge node routes one or more cells to the call processor based on particular PTI values.

4. An ATM communications network for transporting ATM cells from a source to one or more destinations as recited in claim 2, wherein said cell header contains a Payload Type Identification (PTI) field.

5. An ATM communications network for transporting ATM cells from a source to one or more destinations as recited in claim 1, wherein the length of said VPI field is different from the length specified for the VPI field in standard ATM cells.

6. An ATM communications network for transporting ATM cells from a source to one or more destinations as recited in claim 1, wherein the length of said VCI field is different from the length specified for the VCI field in standard ATM cells.

7. An ATM communications network for transporting ATM cells from a source to one or more destinations as recited in claim 5, wherein the length of said VCI field is different from the length specified for the VCI field in standard ATM cells.

8. An ATM communications network for transporting ATM cells from a source to one or more destinations as recited in claim 1, wherein said ATM bridge node.

9. An ATM communications network for transporting ATM cells from a source to one or more destinations as recited in claim 1, wherein said central call processor is located at said ATM bridge node.

10. An ATM communications network for transporting ATM cells from a source to one or more destinations as recited in claim 1, further comprising at least one ATM switch node wherein said central call processor is located external to said ATM bridge node and said ATM switch node.

11. An ATM communications network for transporting ATM cells from a source to one or more destinations as recited in claim 1, further comprising at least one ATM switch node wherein said central call processor is located at said ATM switch node.

12. An ATM communications network for transporting ATM cells from a source to one or more destinations as recited in claim 2, wherein said ATM bridge node translates said VPI field or said ATM cells.

13. An ATM communications network for transporting ATM cells from a source to one or more destinations as recited in claim 4, wherein said ATM bridge node translates said VPI field of said ATM cells.

14. An ATM communications network for transporting ATM cells from a source to one or more destinations as recited in claim 1, wherein said ATM bridge node is located in a satellite.

15. An ATM communications network for transporting ATM cells from a source to one or more destinations as recited in claim 14, wherein said call processor is located on the ground.

16. A method of asynchronous communications for transporting ATM cells from a source to one or more destinations, comprising:
   a) obtaining a path identifier by said source from a central call processor through a control layer of an ATM bridge node, whereby said path identifier identifies a predetermined virtual path between said source and said destinations;
   b) segmenting a message into at least one cell, each cell having a header portion and a data portion, whereby said header portion incorporates said path identifier and said data portion incorporates at least a portion of the message;
   c) transporting said at least one cell to an input port of said ATM bridge node remotely located from said central call processor;
   d) extracting the path identifier within said ATM bridge node from said header portion of said at least one cell;
   e) using a memory in said ATM bridge node, associating a list of at least one output port of said ATM bridge node with said path identifier;
   f) routing said at least one cell to said output port associated with said path identifier in accordance with the pre-established permanent virtual path; and
   g) retaining said pre-established permanent virtual path within said ATM bridge node after said at least one cell has been routed.

17. A method of asynchronous communications for transporting ATM cells from a source to one or more destinations as recited in claim 16, further comprising:
   a) assigning a payload type identifier to said one or more cells responsive to the contents of said one or more cells; and
   b) using a memory in said ATM bridge node, associating a list of output ports of said ATM bridge with said payload type identifier.

18. A method of asynchronous communications for transporting ATM cells from a source to one or more destinations as recited in claim 16, further comprising operating said preestablished permanent virtual paths in an idle mode.

19. A method of asynchronous communications for transporting ATM cells from a source to one or more destinations as recited in claim 16, further comprising translating the path identifier of said cell as said cell is passed through said ATM bridge node.

20. A communication system comprising:
   a first user terminal generating a request for connection setup signal and a call;
   a satellite comprising a first ATM bridge node transmitting a plurality of downlinks and receiving a plurality of uplinks, said downlinks and said uplinks having a plurality of pre-established virtual paths and cells associated therewith, said first ATM bridge node connecting each of the cells in accordance with the plurality of pre-established virtual paths, said plurality of pre-established virtual paths remaining fixed beyond the call, said first ATM bridge node having a control layer for passing the connection setup signal to a ground station;

said ground station having a call processor, said call processor determining a route for the call by determining virtual path identifier (VPI) values for the plurality of pre-established virtual paths, and said ground station communicating the VPI values to the first user terminal through the control layer;

said first user terminal generating cells having said VPI values associated therewith; and said first ATM bridge node routing cells therethrough in response to said VPI values associated with the cells.

21. A system as recited in claim 20 further comprising a second ATM bridge node, coupled to the first ATM bridge node via transmission paths, each of said transmission paths having transmission channels having virtual paths.

22. A system as recited in claim 21 wherein said first ATM bridge node and said second ATM bridge node comprise a respective first network interface and a second network interface.

23. A system as recited in claim 20 wherein said first ATM bridge node and said second ATM bridge node communicate using a word having a header with the VPI values and a virtual circuit identifier.

24. A system as recited in claim 20 wherein said first ATM bridge node comprises a user network interface.

25. A system as recited in claim 24 wherein a call header for said user network interface comprises general flow control.

26. A system as recited in claim 20 wherein said first ATM bridge node comprising a routing table, said first ATM bridge node connecting each of the cells in accordance with the routing table.

27. A method of operating a communication system comprising:

prior to a call request, establishing a plurality of permanent virtual paths within a first satellite based ATM bridge node;

generating a connection setup signal from a user terminal to a call processor in a ground station through a control layer of the first ATM bridge node;

transmitting a response signal having a virtual path identifier from the call processor to the user terminal through the ATM bridge node;

transmitting uplink signals having cells with a virtual path identifier;

extracting ATM cells from input ports associated with respective uplink channels;

decoding the associated header;

extracting the virtual path identifier from the header;

determining an output port from a routing table in response to the header; and routing the ATM cell to the output port using the plurality of permanent virtual paths.

28. A method as recited in claim 27 further comprising maintaining one of the plurality of permanent virtual paths in an idle condition when said one of the plurality of permanent virtual paths does not carry ATM cells.

29. A method as recited in claim 28 wherein said one of the plurality of permanent paths carries operation and maintenance cells when in the idle condition.

30. A method as recited in claim 27 wherein the virtual path comprises an uplink, an intersatellite link from a first satellite to a second satellite, the first satellite and second satellite having permanent virtual paths therein, and respective downlinks.

31. A method as recited in claim 27 wherein the uplink uses a user network interface and the intersatellite link uses a network interface.

32. A method as recited in claim 27 further comprising exchanging signaling messages between user terminals, said ATM bridge node and said central call processor, and processing the signaling messages in the call processor.

33. A method as recited in claim 27 further comprising reconfiguring the permanent virtual paths with a management interface not a signaling interface.

* * * * *